United States Patent
Uhrin

(10) Patent No.: US 9,444,383 B2
(45) Date of Patent: Sep. 13, 2016

(54) METHOD FOR OPEN-LOOP AND CLOSED-LOOP CONTROL OF AN ELECTROMAGNETIC MACHINE

(71) Applicant: BAUMUELLER NUERNBERG GMBH, Nuremberg (DE)

(72) Inventor: Rastislav Uhrin, Saronno (IT)

(73) Assignee: Baumueller Nuernberg GmbH, Nuremberg (DE)

(*) Notice: Subject to any disclaimer, the term of this patent is extended or adjusted under 35 U.S.C. 154(b) by 81 days.

(21) Appl. No.: 14/578,724

(22) Filed: Dec. 22, 2014

(65) Prior Publication Data

US 2015/0180396 A1    Jun. 25, 2015

(30) Foreign Application Priority Data

Dec. 20, 2013 (EP) .................... 13005976

(51) Int. Cl.
| | | |
|---|---|---|
| H02P 23/00 | (2016.01) | |
| H02P 25/00 | (2006.01) | |
| H02P 27/00 | (2006.01) | |
| H02P 21/14 | (2016.01) | |
| H02P 23/03 | (2006.01) | |

(52) U.S. Cl.
CPC ............. *H02P 21/141* (2013.01); *H02P 23/03* (2013.01); *H02P 2207/01* (2013.01)

(58) Field of Classification Search
CPC ...... H02K 11/33; H02K 16/04; H02K 29/03; H02K 21/48; H02K 41/03; H02K 29/00; H02K 11/044; H02K 11/046; H02K 1/2766; H02K 21/38; H02K 11/21; H02K 17/16; H02K 41/025; H02P 21/06; H02P 21/141; H02P 6/185; H02P 6/08; H02P 21/12; H02P 2207/01

See application file for complete search history.

(56) References Cited

U.S. PATENT DOCUMENTS

| | | | | |
|---|---|---|---|---|
| 5,166,593 A | * | 11/1992 | De Doncker | ........... H02P 21/06 318/800 |
| 5,777,452 A | * | 7/1998 | Thomas | ................ H02P 21/141 318/799 |
| 5,929,400 A | * | 7/1999 | Colby | ..................... H02P 21/06 187/290 |

(Continued)

OTHER PUBLICATIONS

Holtz, J.; Juntao Quan, "Sensorless vector control of induction motors at very low speed using a nonlinear inverter model and parameter identification," Industry Applications, IEEE Transactions on, vol. 38, No. 4, pp. 2614-2621, Jul./Aug. 2002.

(Continued)

*Primary Examiner* — Marlon Fletcher
(74) *Attorney, Agent, or Firm* — Laurence A. Greenberg; Werner H. Stemer; Ralph E. Locher

(57) ABSTRACT

Electromagnetic state variables of an electromagnetic machine are represented by space vectors. A setpoint value for the vector of a manipulated voltage at the stator is preset and an actual value of the vector of the current at the stator is measured. A vector of an induced voltage is determined from the setpoint value and the actual value of the vector of the current. A value of a vector of the magnetic flux is estimated from a preset correction voltage and the induced voltage. A phase angle and a rotating field frequency are estimated from the vector of the magnetic flux. A factor is multiplied into the vector of the correction voltage when a torque-forming component of a current at the stator has an opposite mathematical sign to the estimated value of the rotating field frequency.

10 Claims, 2 Drawing Sheets

(56) References Cited

U.S. PATENT DOCUMENTS

| | | | |
|---|---|---|---|
| 2012/0153881 A1* | 6/2012 | Parenti | H02P 21/0089 318/400.02 |
| 2013/0221885 A1* | 8/2013 | Hunter | H02P 6/001 318/400.15 |
| 2013/0278200 A1* | 10/2013 | Fujii | H02P 6/002 318/722 |
| 2013/0342142 A1* | 12/2013 | Marcinkiewicz | H02P 21/141 318/400.11 |
| 2015/0002059 A1* | 1/2015 | Liu | H02P 6/08 318/400.04 |
| 2015/0002067 A1* | 1/2015 | Nondahl | H02P 21/00 318/503 |

OTHER PUBLICATIONS

Holtz, J.; Juntao Quan, "Drift- and parameter-compensated flux estimator for persistent zero-stator-frequency operation of sensorless-controlled induction motors," Industry Applications, IEEE Transactions on , vol. 39, No. 4, pp. 1052,1060, Jul.-Aug. 2003.

* cited by examiner $i_q \cdot \omega_s \geq 0:$  $\gamma = 0$ $i_q \cdot \omega_s < 0:$

METHOD FOR OPEN-LOOP AND CLOSED-LOOP CONTROL OF AN ELECTROMAGNETIC MACHINE

CROSS-REFERENCE TO RELATED APPLICATION

This application claims the priority, under 35 U.S.C. §119, of European patent application EP 13 005 976.9, filed Dec. 20, 2013; the prior application is herewith incorporated by reference in its entirety.

BACKGROUND OF THE INVENTION

Field of the Invention

The invention relates to a method for controlling and regulating (closed-loop controlling) an electromagnetic machine, which comprises a rotor and a stator. Electromagnetic state variables of the machine are determined by way of a mathematical model with space vector representation, wherein an actual value of the vector of the current at the stator is measured, and wherein an estimated value of a vector of the magnetic flux is determined. The invention furthermore relates to an electromagnetic machine.

In an asynchronous machine for which only closed-loop control of the speed is required, it may be advantageous to control this speed without a speed sensor. A closed-loop control system without feedback of a speed signal is more favorable, simpler and more robust. In that case, the control needs to calculate the speed from one or more other measured variables, for example stator currents and/or voltages and a switching model for the motor. If closed-loop control by field oriented control is used, the value and the direction of the magnetic flux is required in addition to the speed. The three mentioned variables can be determined by a so-called observer. This may be a complex model based on estimation theory or else a direct calculation on the basis of the induced voltage of the motor.

Such closed-loop control is known from Holtz, J. and Quan, J.: "Drift- and parameter-compensated flux estimator for persistent zero-stator-frequency operation of sensorless-controlled induction motors", IEEE Transactions on Industry Applications 2003, Vol. 39, Issue 4. Here, the induced voltage is integrated in order to determine the stator flux. Since pure integration in the presence of an offset in the measurement of currents or in the voltage generation would necessarily diverge towards infinity, a correction term is added in the integrand of the induced voltage in order to prevent divergence in the mentioned case and a loss of closed-loop control associated therewith. This correction term is formed by the increased discrepancy between an estimated flux and a setpoint value for a reference flux.

An asynchronous machine may be operated as a motor and as a generator. During operation as a motor, the behavior of the closed-loop control described is largely stable over the entire speed range. During operation as a generator at low rotation speeds, however, the magnetic flux and the speed are not correctly estimated, which results in an instability in the closed-loop control in this operating range. This can occur, for example, in the case of a cable winch which is driven by the asynchronous machine, and energy is fed back to a current source via said asynchronous machine in the case of the lowering of a load. During the transition from the operation as a motor to the operation as a generator, i.e. during the transition from raising to lowering of the load, in this case a loss of control over the closed-loop control can result in the speed of the lowering operation being estimated systematically as being too low, and the load can accelerate practically with freefall.

However, this problem is not restricted to this specific type of closed-loop control, but instead is a general phenomenon in closed-loop control technology for asynchronous machines with the mentioned assumptions. This problem can be handled with an increase in the mathematical complexity of the closed-loop control, for example by using an adaptive complete observer or a Kalman filter. Such an increase in the mathematical complexity can eliminate the problem of the loss of control over the closed-loop control at low rotation speeds during operation as a generator, but does require very complex calculations for this, for which purpose a powerful processor is required. This may be undesirable in specific cases.

SUMMARY OF THE INVENTION

It is accordingly an object of the invention to provide a method for controlling an electro-magnetic machine which overcomes the above-mentioned and other disadvantages of the heretofore-known devices and methods of this general type and to provide a control for an electromagnetic machine which manages without direct measurement of the speed, which can be implemented as easily as possible mathematically and is as stable as possible over the desired rotation speed range of the machine both during operation as a motor and during operation as a generator. A further object of the invention consists in specifying an electromagnetic machine which can be controlled as stably as possible over its desired rotation speed range both during operation as a motor and during operation as a generator.

With the foregoing and other objects in view there is provided, in accordance with the invention, a method for (open-loop, closed-loop) control of an electromagnetic machine having a rotor and a stator, the method comprising:

determining electromagnetic state variables of the machine by way of a mathematical model with a space vector representation;

presetting a setpoint value for a vector of a manipulated voltage at the stator;

measuring an actual value of a vector of a current at the stator;

determining a vector of an induced voltage from the setpoint value for the vector of the manipulated voltage and the actual value of the vector of the current at the stator;

presetting a vector of a correction voltage;

determining an estimated value of a vector of a magnetic flux from the vectors of the correction voltage and the induced voltage; and determining an estimated value of a phase angle and an estimated value of a rotating field frequency from the estimated value of the vector of the magnetic flux;

determining a torque-forming component of the current at the stator from the measured actual value of the vector of the current and the estimated value of the phase angle; and if the torque-forming component of the current at the stator has an opposite mathematical sign to the estimated value of the rotating field frequency, multiplying the vector of the correction voltage by a factor.

In other words, the first mentioned object for a method for controlling and closed-loop controlling an electromagnetic machine, which comprises a rotor and a stator, wherein electromagnetic state variables of the machine are determined by means of a mathematical model with a space vector representation, wherein a setpoint value for the vector of a manipulated voltage at the stator is preset, wherein an actual value of the vector of the current at the stator is measured, wherein a vector of an induced voltage is determined from the setpoint value for the vector of the manipulated voltage and the actual value of the vector of the current, wherein a vector of a correction voltage is preset, wherein an estimated value of a vector of the magnetic flux is determined from the vectors of the correction voltage and the induced voltage, and wherein an estimated value of a phase angle and an estimated value of a rotating field frequency are determined from the estimated value of the vector of the magnetic flux is achieved according to the invention by virtue of the fact that a factor is included in the multiplication for the vector of the correction voltage when a torque-forming component of a current at the stator has an opposite mathematical sign to the estimated value of the rotating field frequency, wherein the torque-forming component of the current at the stator is determined from the measured actual value of the vector of the current and the estimated phase angle.

The torque-forming component of the current at the stator can in this case be determined in particular as the imaginary part of the current in a co-rotating reference system which results from the vector of the measured current at the stator, rotated through the negative estimated phase angle.

In this case, the invention is based first on the consideration that closed-loop control in accordance with the prior art is unstable in the low rotation speed range for generator operation and is substantially unproblematic in all other operating ranges. Should, therefore, there be successful identification of the unstable operating range in a simple and reliable manner in the closed-loop control in order to match the closed-loop control as efficiently as possible in this case and otherwise not to perform any changes, it is possible to dispense with complex measurements or complex mathematical processes.

This identification now takes place via the torque-forming component of the current at the stator. This variable is particularly well suited for the test condition for the critical operating range since, in this case, a direct measured variable is included with the actual value of the vector of the current at the stator. With the phase angle determined inter alia therefrom afterwards, an estimated variable is included in the torque-forming component, which is compared with the estimated value of the rotating field frequency. Starting from a stable closed-loop control for the entire rotation speed range during operation as a motor and, associated therewith, reliability of the estimated values, the functionality of the test condition is therefore even ensured in the case of a particularly critical transition to the operation as a generator since the discrepancy between the real values of the phase angle and of the rotation field frequency and the estimated values used for the test condition can be considered to be small.

During this transition, the fact that only the mathematical sign of the torque-forming current component and of the estimated value of the rotating field frequency are compared also has a stabilizing effect. An error in the torque-forming current component, which can result from, for example, a discrepancy between the estimated phase angle and the real value, can be compensated for given a sufficiently large torque to such an extent that the mathematical sign is not influenced by the error. The estimated value of the rotating field frequency can, as mentioned, be considered to be reliable during operation as a motor. Therefore, an estimation error during the critical transition to the operation as a generator can in any case result in a slightly delayed inclusion of the multiplication of the factor for the correction voltage.

A central concept in respect of the mode of operation of the invention can now be explained with reference to the following physical consideration: the induced voltage is the time derivative of the magnetic flux. This means in particular that the phase angle of the induced voltage is dependent on the change in the phase angle of the magnetic flux, i.e. on the rotating field frequency. During a transition from operation as a motor to operation as a generator with a simultaneous reversal of the direction of rotation, a change in the sense of rotation and therefore a zero crossing of the rotating field frequency take place. In this case, the induced voltage temporarily loses the phase reference which was imparted to it by the rotation of the rotating field. The correction voltage which is intended primarily to take account of a discrepancy between the estimated behavior of the electromagnetic machine and a desired behavior can produce this phase relation again via the factor to be included in the multiplication.

It has proven to be advantageous in this case if a phase factor of the form $e^{i\gamma}$ is used as the factor included in the multiplication for the correction voltage. The closed-loop control itself is stable at relatively high rotation speeds during operation as a motor and during operation as a generator. Only the operation as a generator at low rotation speeds, in particular the above-mentioned transition to the operation as a generator, are considered to be critical. A phase factor of 1 is in this case particularly well suited for producing the mentioned phase relation for the magnetic flux again in a manner which is "minimally invasive".

Preferably, the phase angle $\gamma$ in the phase factor $e^{i\gamma}$ for a vanishing estimated value of the rotating field frequency is selected as $\pi/2$ and decreases monotonically with the increasing absolute value of the estimated value of the rotating field frequency. In this case, the following consideration is assumed: the estimated value of the vector of the magnetic flux is determined from the vectors of the correction voltage and the induced voltage. In the steady-state case, i.e. in the case of constant magnitudes and frequencies, the induced voltage is orthogonal to the magnetic flux. If the transition to the operation as a generator is not considered to be dynamic, but as a small disturbance to the steady-state case, the phase relation to the magnetic flux which would have the induced voltage in the undisrupted steady-state case is provided by a selection of $\pi/2$ for the phase factor $\gamma$ of the correction voltage, in simplified terms. The correction voltage therefore corrects the induced voltage in the sense of a quasi-steady-state solution. As the absolute value of the rotating field frequency increases during operation as a generator, the electromagnetic machine enters an operating range in which even closed-loop control in accordance with the prior art is largely stable again. Therefore, as the rotating field frequency increases, the phase factor $\gamma$ can be dispensed with even during operation as a generator.

One possibility for this consists in that the phase angle $\gamma$ in the phase factor $e^{i\gamma}$ of the estimated value of the rotating field frequency has a functional dependence provided by $$\gamma = \frac{\pi}{2}\frac{c - |\omega_s|}{c} \text{ for } 0 \le |\omega_s| \le c,$$

$$\gamma = 0 \text{ for } |\omega_s| > c,$$

where $\omega_s$ is the rotating field frequency, and c is a preset threshold value. This means that the phase factor $e^{i\gamma}$ with the phase angle $\gamma = \pi/2$ is included in the multiplication for the correction voltage directly at the transition from operation as a motor to operation as a generator, and the phase angle γ decreases linearly as the rotation field frequency $\omega_s$ increases and disappears at a threshold value c, with the result that the phase factor $e^{i\gamma}$ remains equal to 1 above the threshold value c. This threshold value can in this case be selected by a motor parameter, for example by a component of the synchronous motor frequency or a component of the maximum frequency for which the machine is mechanically designed as a maximum.

As an alternative to this, the phase angle γ asymptotically approaches zero as the absolute value of the estimated value of the rotating field frequency increases. This can take place, for example, by functional implementation of an exponential decrease or else a Lorentz line. The full duration at half maximum or the line width can in this case be selected by motor parameters such as a component of the synchronous motor frequency or a component of the maximum frequency for which the machine is mechanically designed at a maximum. An asymptotic decrease in the phase angle γ has the advantage that no further testing of a condition for the rotating field frequency is required.

Preferably, the vector of the induced voltage is determined from the setpoint value for the vector of the manipulated voltage minus the product of the stator resistance and a current variable derived from the actual value of the vector of the current, i.e.

$$E_{\alpha\beta} = V^*_{\alpha\beta} - i(I_{\alpha\beta}) \cdot R_s,$$

where $E_{\alpha\beta}$ denotes the vector of the induced voltage, $V^*_{\alpha\beta}$ denotes the vector of the manipulated voltage, $i(I_{\alpha\beta})$ denotes a current variable derived from the vector of the current $I_{\alpha\beta}$, and $R_s$ denotes the stator resistance. In particular, the current variable $i(I_{\alpha\beta})$ can also be formed by the actual value of the vector of the current $I_{\alpha\beta}$ itself, or by estimation of a development of the vector of the current on the basis of a measured value of the vector of the current $I_{\alpha\beta}$.

The specified functional relationship reproduces a conventional model of a machine based on electromagnetic induction. In particular, the stator resistance can only be known approximately in this case. This may be the case when the stator resistance during operation of the machine is dependent on the operating conditions and increases as the temperature increases, for example. If the resistance is not measured during operation, a fixed variable which represents an estimation of the unknown real value is included in the closed-loop control.

In accordance with an advantageous embodiment of the invention, the estimated value of the vector of the magnetic flux is determined by integration of the sum of the vectors of the correction voltage and the induced voltage, i.e.

$$\phi_{\alpha\beta}^s = \int dt (V_{\alpha\beta}^c + E_{\alpha\beta}),$$

wherein $\phi_{\alpha\beta}^s$ denotes the vector of the magnetic flux, and $V_{\alpha\beta}^c$ denotes the vector of the correction voltage. In particular, in this case a factor, in particular a phase factor $e^{i\gamma}$, is included in the multiplication with the vector of the correction voltage when the torque-forming component of the current at the stator has a mathematical sign which is opposite that of the estimated value of the rotating field frequency $\omega_s$, i.e.

$$\phi_{\alpha\beta}^s = \int dt (e^{i\gamma} \cdot V_{\alpha\beta}^c + E_{\alpha\beta}) \text{ for } i_q \cdot \omega_s < 0.$$

In accordance with Faraday's law, the induced voltage is the time derivative of the magnetic flux. The correction voltage $V_{\alpha\beta}^c$ can now be selected such that it prevents divergence of the above integration of Faraday's law if a constant offset occurs, for example in the measurement of the current at the stator.

Expediently, the estimated value of the phase angle $\theta_s$ is determined as the phase angle of the estimated value of the vector of the magnetic flux $\phi_{\alpha\beta}^s$, and the estimated value of the rotating field frequency $\omega_s$ is derived from a change in the estimated value of the phase angle $\theta_s$ over time. This functional relationship reproduces a conventional model of a machine based on electromagnetic induction. In particular, in this case the estimated value of the rotating field frequency can also be derived from a time derivative of the phase angle or from a discrete method which, in terms of the limit value, converges towards a time derivative of the phase angle.

It has proven to be advantageous if a setpoint value for the magnetic flux is preset, and in that the vector of the correction voltage is preset as $$V_{\alpha\beta}^c = G \cdot (e^{i\theta_s} \cdot \phi^*_d - \phi_{\alpha\beta}^s),$$

where $e^{i\theta_s}$ is the phase assigned to the estimated value of the phase angle $\theta_s$, $\phi^*_d$ is a setpoint value for the magnetic flux, and G is a real-value gain. The setpoint value for the magnetic flux can in this case be preset by the control of the desired rotation speed, and then transformed into stator-fixed coordinates by means of the phase $e^{i\theta_s}$ in order thus to determine the deviation from the estimated value of the vector of the magnetic flux $\phi_{\alpha\beta}^s$ and to correct the estimated value of the vector of the magnetic flux $\phi_{\alpha\beta}^s$ corresponding to this deviation via the correction voltage.

The second-mentioned object is achieved according to the invention by an electromagnetic machine comprising a control unit, which is designed to implement the method having the above-described features. The advantages specified for the method and its developments can be transferred expediently to the electromagnetic machine.

Other features which are considered as characteristic for the invention are set forth in the appended claims.

Although the invention is illustrated and described herein as embodied in a method for open-loop and closed-loop control of an electromagnetic machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
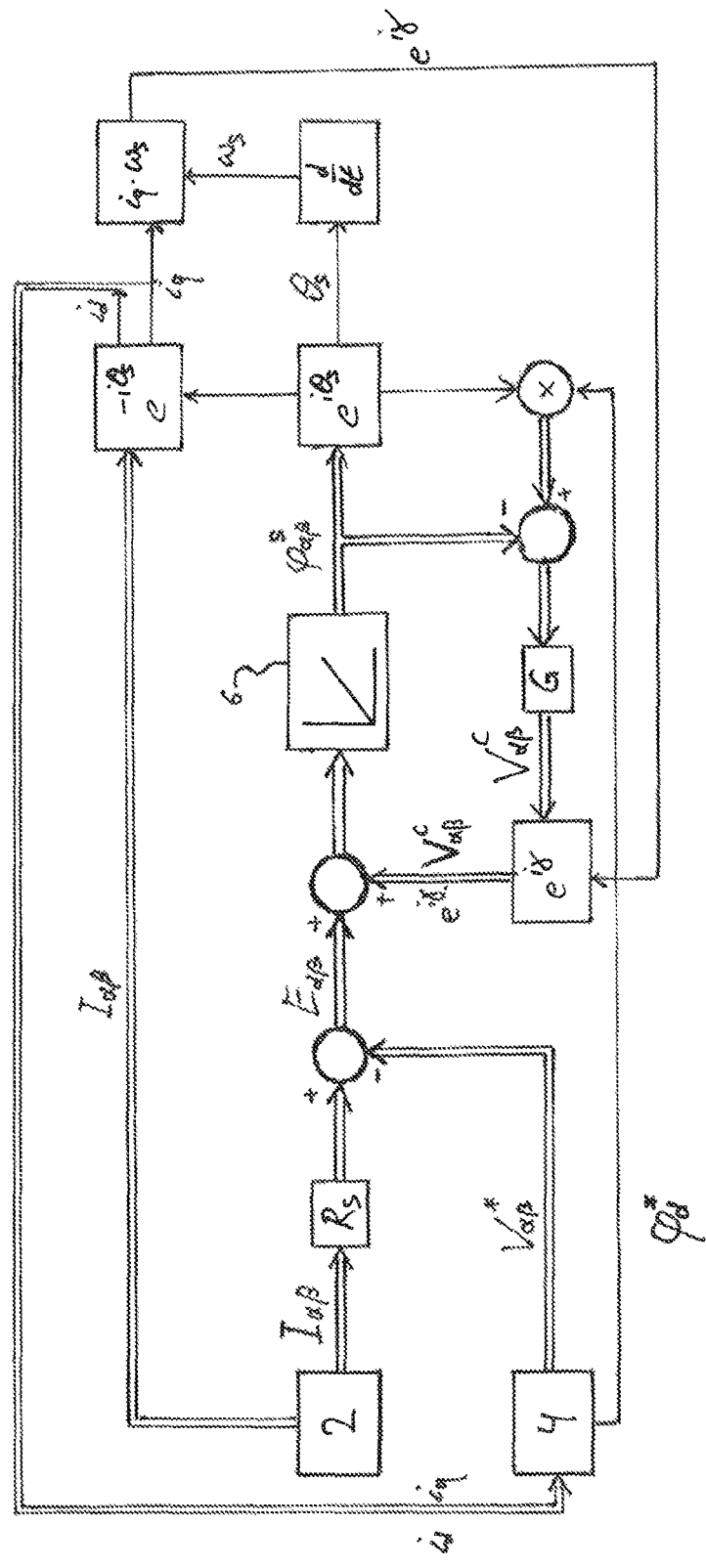
FIG. 1 is a diagrammatic flowchart of closed-loop control for an electromagnetic machine.

Referring now to the figures of the drawing in detail and first, particularly, to FIG. 1 thereof, there is shown a flowchart of the control loop 1 for an electromagnetic machine. A measuring unit 2 measures a stator current $I_{\alpha\beta}$ at a stator of an asynchronous machine. A manipulated voltage $V^*_{\alpha\beta}$ is preset on the basis of the rotation speed desired for operation by a central rotation speed control system 4. With the stator resistance $R_s$, the induced voltage $E_{\alpha\beta}$ is calculated as $E_{\alpha\beta}=V^*_{\alpha\beta}-I_{\alpha\beta} \cdot R_s$. A correction voltage $V_{\alpha\beta}^c$ is added to the induced voltage $E_{\alpha\beta}$. In accordance with Faraday's law, the induced voltage $E_{\alpha\beta}$ together with the correction voltage $V_{\alpha\beta}^c$, is integrated over time in the integrator 6 in order thus to obtain an estimated value for the magnetic flux $\phi_{\alpha\beta}^s$ at the stator. The correction voltage $V_{\alpha\beta}^c$ added to the induced voltage $E_{\alpha\beta}$ performs the function, in the integrand, of stabilizing the integral in the case of a constant offset, for example, in the measured value of the stator current $I_{\alpha\beta}$, in order to prevent divergence.

The estimated value of the magnetic flux $\phi_{\alpha\beta}^s$ can be divided into a magnitude $|\phi_{\alpha\beta}^s|$ and a phase $e^{i\theta_s}$. The estimated value of the phase angle $\theta_s$ of the phase $e^{i\theta_s}$ is derived over time in order to obtain an estimated value for the rotating field frequency $\omega_s$. The field-forming component $i_d$ and the torque-forming component $i_q$ of the stator current can be determined as real or imaginary part of $I_{\alpha\beta} \cdot e^{-i\theta_s}$ by back-transformation with the negative estimated value of the phase angle $\theta_s$ from the stator current $I_{\alpha\beta}$ measured by the measuring unit 2. The field-forming component $i_d$ and the torque-forming component $i_q$ of the stator current are fed back to the central rotation speed control system 4, where the variables are included in the calculation of the manipulated voltage $V^*_{\alpha\beta}$.

In order to determine the correction voltage $V_{\alpha\beta}^c$, a setpoint value for the magnetic flux $\phi^*_d$ is preset by the central rotation speed control system 4. This setpoint value is transformed into the corresponding phase angle at the stator via the estimated phase $e^{i\theta_s}$, and the estimated value of the magnetic flux $\phi_{\alpha\beta}^s$ is subtracted from this. The result is multiplied by a real-value gain G.

If the mathematical sign of the product of the torque-forming component $i_q$ of the stator current and the estimated value of the rotating-field frequency $\omega_s$ is now positive, the value $V_{\alpha\beta}^c=G \cdot (e^{i\theta_s} \cdot \phi^*_d - \phi_{\alpha\beta}^s)$ is passed on directly as correction voltage. If the mathematical sign of the product of the torque-forming component $i_q$ of the stator current and the estimated value of the rotating field frequency $\omega_s$ is negative, a phase factor $e^{i\gamma}$ is included in the multiplication with this correction voltage.

Figure 2:
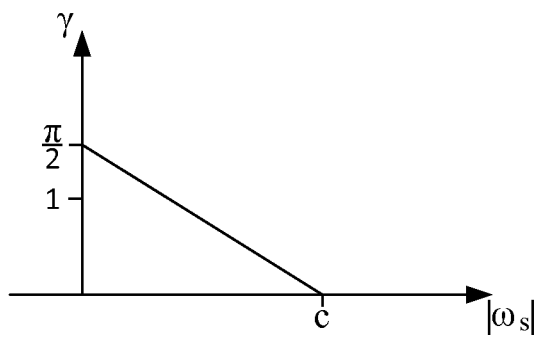
FIG. 2 shows a graph of a possible functional dependence of the phase angle γ in the phase factor $e^{i\gamma}$ of the correction voltage on the estimated rotating field frequency.

A possible functional dependence of the phase angle $\gamma$ in this phase factor $e^{i\gamma}$ on the absolute value of the rotating field frequency $\omega_s$ is illustrated in more detail in FIG. 2. For $i_q \cdot \omega_s \geq 0$, the correction voltage $V_{\alpha\beta}^c$ without the phase factor $e^{i\gamma}$ needs to be output to the integrator 6, which can also be formulated by constant $\gamma=0$ for this case. For $i_q \cdot \omega_s<0$, $\gamma$ is selected as $\gamma=\pi/2$ for a vanishing value of $|\omega_s|$. As the value for $|\omega_s|$ increases, the phase angle $\gamma$ decreases linearly until it assumes the value 0 in the case of a preset threshold value c for $|\omega_s|$, which may be selected by a fraction of the synchronous frequency of the asynchronous machine, for example. At values for $|\omega_s|$ of above the preset threshold value c, the phase angle remains $\gamma=0$.

Although the invention has been illustrated and described in more detail by the preferred exemplary embodiment, the invention is not restricted to this exemplary embodiment. Other variations can be derived from this by a person skilled in the art without departing from the scope of protection of the invention.

The following is a summary list of reference numerals and the corresponding structure used in the above description of the invention:
1 control loop
2 measurement unit
4 central rotation speed control system
6 integrator
$I_{\alpha\beta}$ stator current
$V^*_{\alpha\beta}$ manipulated voltage
$R_s$ stator resistance
$E_{\alpha\beta}$ induced voltage
$V_{\alpha\beta}^c$ correction voltage
$\phi_{\alpha\beta}^s$ estimated value of the magnetic flux
$e^{i\theta_s}$ estimated value of the phase of the rotating field
$\theta_s$ estimated value of the phase angle of the rotating field
$\omega_s$ estimated value of the rotating field frequency
$i_d$ field-forming component of the stator current
$i_q$ torque-forming component of the stator current
$\phi^*_d$ setpoint value for the magnetic flux
G gain
$e^{i\gamma}$ phase factor of the correction voltage
$\gamma$ phase angle
c threshold value

The invention claimed is:

1. A method for controlling an electromagnetic machine having a rotor and a stator, the method comprising:
   determining electromagnetic state variables of the machine by way of a mathematical model with a space vector representation;
   presetting a setpoint value for a vector of a manipulated voltage at the stator;
   measuring an actual value of a vector of a current at the stator;
   determining a vector of an induced voltage from the setpoint value for the vector of the manipulated voltage and the actual value of the vector of the current at the stator;
   presetting a vector of a correction voltage;
   determining an estimated value of a vector of a magnetic flux from the vectors of the correction voltage and the induced voltage; and
   determining an estimated value of a phase angle and an estimated value of a rotating field frequency from the estimated value of the vector of the magnetic flux;
   determining a torque-forming component of the current at the stator from the measured actual value of the vector of the current and the estimated value of the phase angle; and
   if the torque-forming component of the current at the stator has an opposite mathematical sign to the estimated value of the rotating field frequency, multiplying the vector of the correction voltage by a factor.

2. The method according to claim 1, wherein the factor for multiplying with the correction voltage is a phase factor having the form $e^{i\gamma}$, wherein $\gamma$ is a phase angle.

3. The method according to claim 2, which comprises selecting the phase angle $\gamma$ in the phase factor for a vanishing estimated value of the rotating field frequency as $\pi/2$ and decreasing monotonically with an increasing absolute value of the estimated value of the rotating field frequency.

4. The method according to claim 3, wherein the phase angle $\gamma$ in the phase factor of the estimated value of the rotating field frequency has a functional dependence provided by $$\gamma = \frac{\pi}{2} \frac{c - |\omega_s|}{c} \text{ for } 0 \leq |\omega_s| \leq c,$$
$$\gamma = 0 \text{ for } |\omega_s| > c,$$

where c is a preset threshold value and $\omega_s$ is the rotating field frequency.

5. The method according to claim 3, wherein the phase angle $\gamma$ asymptotically approaches zero as an absolute value of the estimated value of the rotating field frequency increases.

6. The method according to claim 1, which comprises determining the vector of the induced voltage from the setpoint value for the vector of the manipulated voltage minus a product of a stator resistance and a current variable derived from the actual value of the vector of the current.

7. The method according to claim 1, which comprises determining the estimated value of the vector of the magnetic flux by integration of a sum of the vectors of the correction voltage and the induced voltage.

8. The method according to claim 1, which comprises determining the estimated value of the phase angle as the phase angle of the estimated value of the vector of the magnetic flux, and deriving the estimated value of the rotating field frequency from a change in the estimated value of the phase angle over time.

9. The method according to claim 1, which comprises presetting a setpoint value for the magnetic flux, and presetting the vector of the correction voltage as $$V_{\alpha\beta}^{c} = G \cdot (e^{i\theta_s} \cdot \phi^{*}_{d} - \phi_{\alpha\beta}^{s}),$$

where $\phi_{\alpha\beta}^{s}$ is the estimated value of the vector of the magnetic flux, $e^{i\theta_s}$ is a phase assigned to the estimated value of the phase angle, and G is a real-value gain.

10. An electromagnetic machine, comprising a control unit configured to implement the method according to claim 1.

* * * * *